United States Patent
Amora et al.

(10) Patent No.: US 8,626,120 B2
(45) Date of Patent: Jan. 7, 2014

(54) METHODS TO IMPROVE AUTOMATED CHECK-IN

(75) Inventors: Kristoffer Dominic Amora, Mandaue (PH); Cres Daryl C. Sadernas, Iligan (PH)

(73) Assignee: NCR Corporation, Duluth, GA (US)

( * ) Notice: Subject to any disclaimer, the term of this patent is extended or adjusted under 35 U.S.C. 154(b) by 75 days.

(21) Appl. No.: 12/976,375

(22) Filed: Dec. 22, 2010

(65) Prior Publication Data

US 2012/0164990 A1  Jun. 28, 2012

(51) Int. Cl.
  *H04M 11/00* (2006.01)
(52) U.S. Cl.
  USPC ..... 455/407; 455/408; 455/414.2; 455/414.4; 455/412.1; 455/41.1; 455/41.2
(58) Field of Classification Search
  USPC .................. 455/414.3, 41.1, 41.3
  See application file for complete search history.

(56) References Cited

U.S. PATENT DOCUMENTS

| | | | | |
|---|---|---|---|---|
| 7,275,689 B2* | 10/2007 | Mak | ............... | 235/384 |
| 7,424,267 B2* | 9/2008 | Eisenbach | ............... | 455/41.2 |
| 7,520,427 B2* | 4/2009 | Boyd | ............... | 235/382 |
| 2004/0030601 A1* | 2/2004 | Pond et al. | ............... | 705/16 |

* cited by examiner

*Primary Examiner* — Charles Appiah
*Assistant Examiner* — Randy Peaches
(74) *Attorney, Agent, or Firm* — Robert S. Chee; Peter H. Priest

(57) ABSTRACT

Techniques are provided to automate at least some of the information gathering required for check-in using a mobile device. A user may enter at least some required information using a mobile application on a mobile device. The mobile application may convert the entered data into a Quick Response ("QR") code or other type of readable form that may be read or received by a device at the location of check-in. The information entered may be stored in the mobile device's memory and may be modified for future check-ins. A user would enter the location of check-in and present the mobile phone containing the information previously entered by the user to a reader at the location. The reader reads the information which may be transmitted to the location's database. Using the information submitted, the user may be checked in automatically.

19 Claims, 3 Drawing Sheets

100

120

METHODS TO IMPROVE AUTOMATED CHECK-IN

FIELD OF THE INVENTION

The present invention relates generally to customer check-in.

BACKGROUND

Checking-in at any location, such as at a hospital, medical office, hotel, or travel area presents many tedious tasks for the consumer. For example, at a hospital, the user might be presented with many forms and notices to complete and sign. The task of checking-in is often not improved even with access to a self-service touch-based computing device, or kiosk, as users may take extended amounts of time to complete each form on the kiosk. This problem of long waits worsens if a limited number of kiosks are available as users may have to wait for kiosks to become available for use. This may increase the waiting time for users to be checked-in rather than streamlining the process. As user visits increase, and users become more comfortable with checking in at kiosks, the problems may continue to worsen. Therefore, more efficient techniques in which to perform automated check-ins are important.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for automating check-in using a mobile device. In an embodiment, a user provides at least some required information using a mobile application on a mobile device. The mobile application on the mobile device may convert that data into a Quick Response ("QR") code or any other type of readable form that may be read or received by a device at the location of check-in. The information entered may be stored in the mobile device's memory and may be modified for future check-ins. A user would enter a particular location requiring check-in and present the mobile phone containing the information previously entered by the user to a reader at the particular location. The reader reads the information and the information may be transmitted to the location's database. Using the information submitted, the user is either checked in automatically or the check-in process is significantly curtailed with the information presented.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
FIG. 1A is an illustration of a mobile device displaying a mobile application for automated check-in, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and techniques are described that improve how a user may automatically check-in to a location. The process of checking-in at a particular location often presents many tedious tasks that the consumer faces. One primary example is checking-in at a hospital. When a user first enters a hospital, the user is presented with many forms and notices to complete. These include filling in such standard information as name and address, but also includes more specific questions such as medical history, known allergies, and blood type. Completing each and every form is a time consuming and tedious process. Similar forms may need to be completed for follow-up visits as well. This task is worsened should the user be very sick and not in optimal condition.

Hospitals have attempted to improve the tedious task of checking in. For example, many hospitals or medical centers have installed self-service touch-based computing devices, or kiosks, in order to help automate the process and allow users more options to check in. However, the use of kiosks presents its own challenges. For example, users might take extended amounts of time to complete each form. Under this circumstance, lines may form for using a kiosk and actually extend the time for checking in. This problem worsens if a limited number of kiosks are available. The lines would increase in size and users may have to wait longer for kiosks to become available for use. This may increase the waiting time for users to be checked-in rather than streamlining the process.

In an embodiment, techniques are described to automate check-in using a mobile device. A user provides information using a mobile application on a mobile device. The mobile application on the mobile device converts that data into a Quick Response ("QR") code readable by a device at check-in. When the user enters a particular location requiring check-in, the user presents the mobile phone containing the information to a reader at the particular location. The reader reads the information and using the information submitted, the user may be checked in automatically.

The techniques described are not limited to check-in at medical centers or hospitals. Rather, the technique may be used by any location requiring check-in including, but not limited to, hotels, airports, car rentals, movie theaters, and amusement parks. By curtailing the time necessary that users require at a kiosk, the kiosk may be made more available, and more importantly, the check-in time is reduced.

Furthermore, to encourage the use of automated check-in, the location may offer incentives. For example, if the check-in was to an amusement park or for a rental car, a discount may be offered. At a hospital, dedicated kiosks just for use with mobile devices may be offered to further speed check-in. These and other actions may be used to encourage the use of automated check-in.

Using the Mobile Application

In an embodiment, a user may wish to use automated check-in at a particular location, such as at a hospital. The user may access a mobile application on a mobile device. In order to access the mobile application, a user may have to request that the application be downloaded to the mobile device or point the mobile device's browser to an appropriate web address. As used herein, a mobile device may include, but is not limited to, a cell phone, a smartphone, a personal data assistant ("PDA"), a tablet computer, a laptop, or any other mobile computing device. In an embodiment, the application may be unique to the type of phone used (e.g. "iPhone application", "Android application", "Blackberry application," etc.). In another embodiment, the application may be accessed as a website optimized for mobile phones. In yet another embodiment, the application may be available as part of a general website accessible by a home computer. The application is further not limited to applications accessible by mobile device or computer, but may also be phone-accessible using interactive voice response ("IVR") commands.

The user may access the application at any location. Because a mobile device is portable and convenient, the user may have the option of using the application at home, on the way to the location, or even upon arrival at the location if it is found to be very busy and check-in has long waits. If a mobile application is used, then the user may not be required to have an active connection to the network in order to complete check-in. For example, the mobile application may be a stand alone application that does not need to access a server or communicate any data with any remote server in order to encode the information entered by the user. By having the application be accessible via a web browser, some data communication may be required necessitating at least some connection to a network in order to encode the data. An illustration of a mobile device with a mobile application is shown as FIG. 1A. As seen in FIG. 1A, mobile device 100 is shown with display showing mobile application 110.

The provider of automated check-in may select whether to provide the automatic check-in feature as a mobile application or as part of a website. Based upon the types of information that needs to be entered to have proper check-in, the features of the application may vary. For example, when checking-in at a hospital a user may have to submit such standard information as name and address, but also includes more specific questions for the visit such as medical history, known allergies, blood type, and the reason for the visit.

In an embodiment, based on the information that must be entered, the application may vary on how information is input. For example, the application may have simple text boxes for entering personal information such as name and address. However, for more complete responses such as medical history, the application may accept input via voice recognition or other such methods. In other instances, the application may be able to accept input via a stylus or pointer in order to complete a written entry, such as, a signature. The application may also accept other forms of input such as a picture taken from the mobile device as a visual record of, for instance, a skin condition or wound.

Data Conversion on the Mobile Device

In an embodiment, when the user has completed entering data on the mobile application, the mobile application converts the data to a form readable by the automated check-in kiosk. In an embodiment, the data may be converted to QR code. A QR Code is a matrix barcode (or two-dimensional code), readable by scanners. QR code comprises black modules arranged in a square pattern on white background. The information encoded can be text, URL or other data. QR code may contain a varying amount of information. For example, for numeric characters only, 7,089 characters may be encoded. For alphanumeric characters, 4,296 characters may be encoded. And for binaries, a maximum of 2,953 bytes may be encoded. Furthermore, QR code may be read very quickly by the optical scanning device.

Figure 1B:
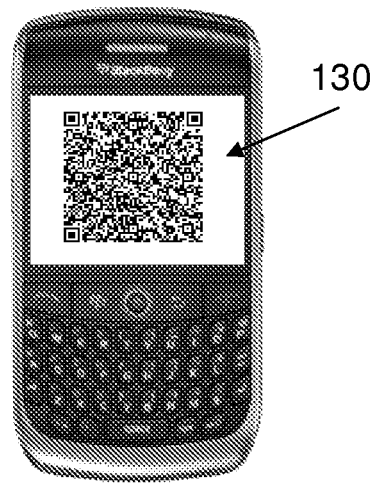
FIG. 1B is an illustration of a mobile device displaying QR code for automated check-in, according to an embodiment of the invention.

By converting the data into QR code and maintaining the information with the mobile device only, several advantages are encountered. Foremost is privacy. The user is always in control of his own data by virtue of the data never being sent over a network or compromised in any way. The data may be compromised if the mobile device is stolen, but additional security measure may be undertaken such as adding password protection or authentication measures before the data may be accessed by the user of the mobile device. In addition, the data is not subject to a network as the data is not sent from the mobile device. If the user was in an area of heavy data congestion, then he might have difficulties sending or transmitting the data in order to perform the automated check-in. An illustration of a mobile device with a mobile application that has converted data to QR code is shown as FIG. 1B. As seen in FIG. 1B, mobile device 120 is shown with display showing QR code 130.

In an embodiment, data may be converted into another encoded optical form capable of being read by a reader. For example, a company might wish to employ a completely proprietary code. Under this circumstance, the data is more secure and less compromised, as the reader must be able to decode the proprietary code which is much less likely than a standard or open source standard. In another example, a UPC code may be used, though the amount of data capable of being stored is very limited. In an embodiment, the encoded data may be encrypted to further ensure security.

In an embodiment, data may be transmitted directly from the mobile device over a network rather than using an encoded QR code. This relieves the user from having to find an open kiosk, or a kiosk that specifically has the ability to read the code from the mobile device. Under this circumstance, the user may simply transmit the data when beginning the trip to a hospital. The hospital receives the necessary check-in data early and the file of the user is prepared and ready when the user finally arrives. The user may simply inform the front desk that he arrived and the appointment may commence.

Using the Mobile Application for Check-in

Figure 1C:
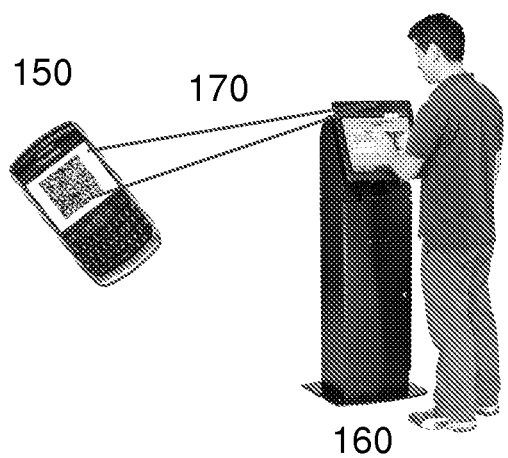
FIG. 1C is an illustration of a mobile device presented to a kiosk for reading to perform automated check-in, according to an embodiment of the invention.

In an embodiment, when a user arrives at a location requiring check-in, the user may search for a kiosk that is able to read code from the mobile device. When an available kiosk is found, the QR code displayed on the mobile device is presented to an optical sensor located on the kiosk. An illustration of a mobile device presented to a kiosk is shown as FIG. 1C. As seen in FIG. 1C, mobile device 150 is presented to kiosk 160 for automated check-in. Kiosk 160 reads the QR code from mobile device 150 via optical scanning 170.

In an embodiment, kiosks are equipped with an optical sensor. For example, the kiosk may be equipped with a camera. A user may place their mobile device with an optical code, in order to read and analyze the QR code, or propriety code displayed on the mobile device. With a camera, an image of the QR code may be taken and analyzed in order to extract the data from the QR code. In another example, the kiosk may be equipped with a scanner. The scanner may read via a laser or any other form of optical sensing light.

In another embodiment, kiosks may not be equipped with a camera. Under this circumstance, other methods may be employed in order to transfer the data from the mobile device to the kiosk. For example, the user may use multimedia messaging service ("MMS") or Bluetooth. MMS is a technology that allows the sending of messages that include multimedia to and from mobile devices. As another example, the data may also be transferred using an RFID or a near field communication (NFC) tag in a mobile device. An antenna from the ordering system may receive the signal transmitted by the mobile device.

In an embodiment, once the code is read or received by the kiosk, the data entered by the user is used to perform check-in. In some instances, the data acquired from the mobile device may be sufficient to complete check-in without any further information or action required by the user. In other embodiments, the user may be required to confirm the data at the kiosk, or to sign any forms or any other such notices in order to adequately complete check-in.

In an embodiment, the kiosk sends the data received from the user to a server or database of the location for check-in. In an embodiment, the data may be sent directly from the mobile device to the server of the location for check-in. Under this circumstance, check-in for these locations may not be as strict with privacy as with a check-in for a hospital. For example, a hotel check-in or check-in to an amusement park does not have the regulations as a hospital requiring that patient data be held confidentially.

In an embodiment, the encoded data on the mobile device may continue to be stored on the mobile device or erased right after check-in. The decision of whether to maintain the encoded data may be made with the user or may be automatically erased after check-in in order to ensure privacy of that particular data. If the data is stored on the mobile device, the data may be modified at a later time in order to speed check-in on a future visit without having to re-enter all data for the user once again.

Illustrated Example

Figure 2:
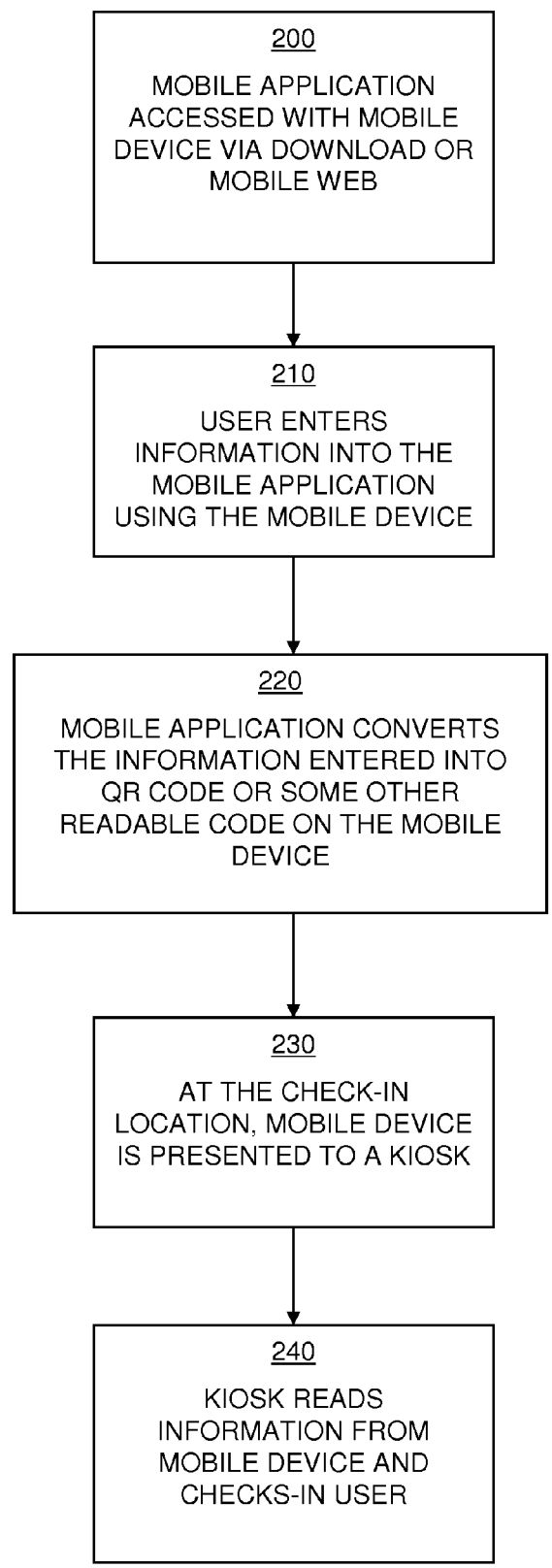
FIG. 2 is an illustration of a workflow for automated check-in, according to an embodiment of the invention.

FIG. 2 illustrates steps performed in order to perform automated check-in via a mobile device at a particular location. In step 200, a user decides to use the automated check-in process and so accesses a mobile application via download or a mobile web browser. In step 210, the user may enter at least some required information using a mobile application on a mobile device. The mobile application may convert the entered data into a QR code or other type of readable form that may be read or received by a kiosk at the particular location, as shown in step 220. In step 230, the user enters the particular location and presents the mobile phone containing the information previously entered by the user to a reader on a kiosk at the location. The kiosk reads the information which may be transmitted to the location's server in step 240 and the user is checked in.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
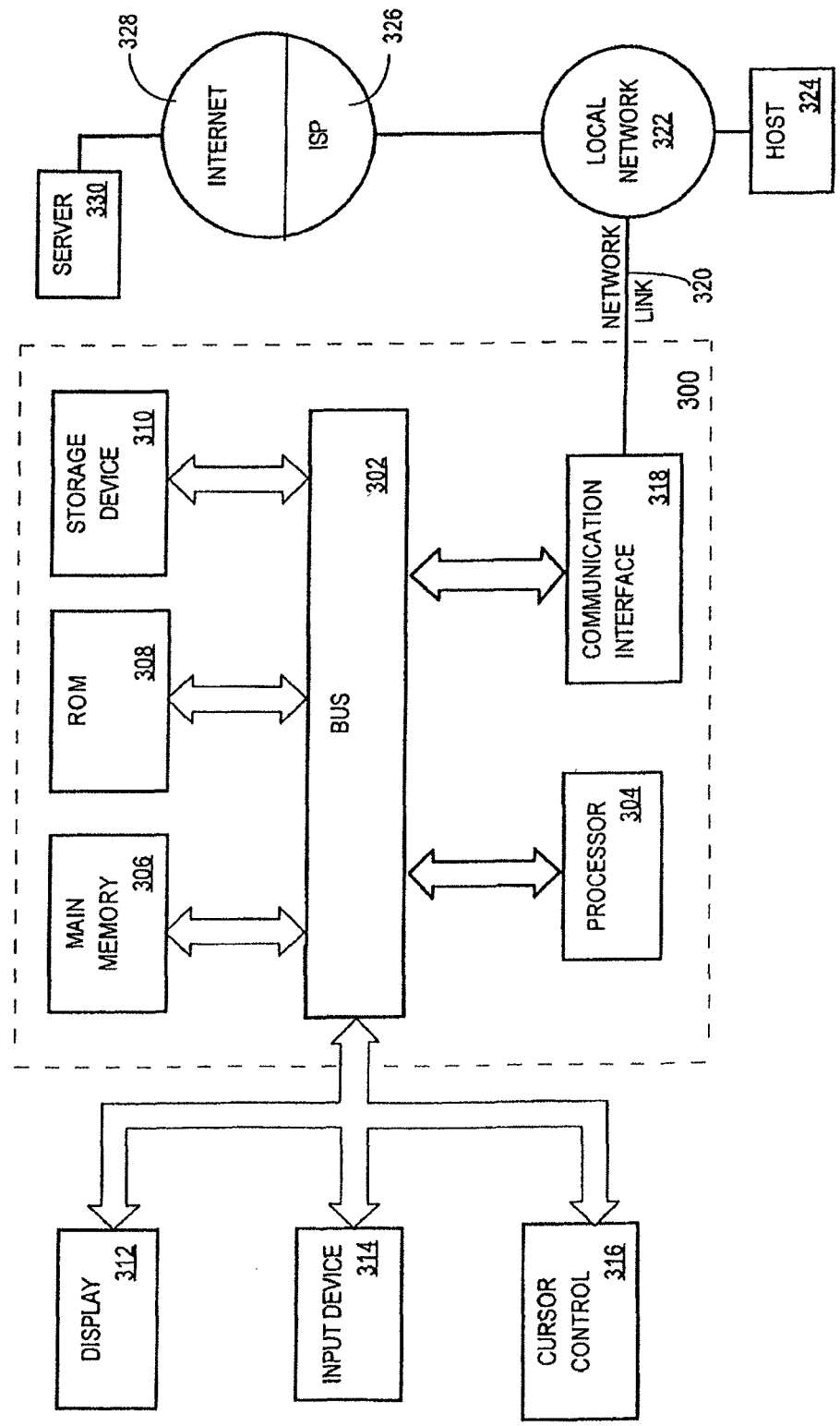
FIG. 3 is a block diagram of a system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a request for a mobile application from a user using a mobile device;
   transmitting a request for access to the mobile application;
   receiving the mobile application and displaying the mobile application to the user, wherein the mobile application is a standalone download for the mobile device that does not communicate any user data with a remote server to encode data entered by the user;
   receiving data in the mobile device entered by the user in response to the mobile application, said data comprising information required for check-in;
   converting the entered data into code locally in the mobile device; presenting the code to a reader to complete check-in, wherein the method is performed by one or more special-purpose computing devices.

2. The method of claim 1, wherein the mobile application is accessed via a mobile browser on the mobile device.

3. The method of claim 1, wherein the mobile device comprises one of a cell phone, a smartphone, a personal data assistant ("PDA"), a tablet computer, a laptop, or a notepad.

4. The method of claim 1, wherein the code is a QR code encoding said information required for check-in.

5. The method of claim 4, wherein presenting further comprises presenting the QR code to an optical sensor on the reader.

6. The method of claim 1, wherein the code is UPC code.

7. The method of claim 1, wherein presenting further comprises forming a Bluetooth connection to the reader.

8. The method of claim 1, wherein presenting further comprises transmitting a MMS message to the reader.

9. The method of claim 1, wherein presenting further comprises transmitting data via a RFID tag.

10. The method of claim 1, wherein presenting further comprises transmitting data via a NFC tag.

11. The method of claim 1, further comprising the reader transmitting the data to a server to complete check-in.

12. The method of claim 1, wherein the data from the user is stored on the mobile device when check-in is completed.

13. The method of claim 1, wherein the data from the user is erased from the mobile device once check-in is completed.

14. The system of claim 1, further comprising the reader transmitting the data received from the mobile device to a server to complete check-in.

15. A system comprising:
one or more mobile devices; and
one or more self-service touch-based computing devices;
wherein one or more requests are received by a mobile device from a user for a mobile application to perform automated check-in, wherein the mobile application is a standalone download for the mobile device that does not communicate any user data with a remote server to encode data entered by the user;
the mobile device requesting access to the mobile application;
the mobile device receiving access to the mobile application; the mobile device receiving data entered by the user in response to the mobile application, said data comprising information required for check-in;
the mobile application converting the data into code locally;
the self-service touch-based computing device reading the code from the mobile device when placed in proximity to a sensor on the self-service touch based computing device; and
the self-service touch-based computing device completing check-in for the user.

16. The system of claim 15, wherein the mobile application is a standalone download for the mobile device.

17. The system of claim 15, wherein the mobile application is accessed via a mobile browser on the mobile device.

18. The system of claim 15, wherein the code is a QR code encoding said information required for check-in.

19. The system of claim 18, wherein presenting further comprises presenting the QR code to an optical sensor on the reader.

* * * * *